April 26, 1960

C. B. NORTON 2,934,083

COMPRESSOR VALVE

Filed Oct. 7, 1955

INVENTOR
Charles B. Norton

BY Mason, Fenwick & Lawrence
ATTORNEYS

April 26, 1960

C. B. NORTON 2,934,083

COMPRESSOR VALVE

Filed Oct. 7, 1955

INVENTOR
Charles B. Norton

BY Mason, Fenwick & Lawrence
ATTORNEYS

United States Patent Office 2,934,083
Patented Apr. 26, 1960

2,934,083

COMPRESSOR VALVE

Charles B. Norton, El Paso, Tex.

Application October 7, 1955, Serial No. 539,064

4 Claims. (Cl. 137—454.4)

This invention relates to suction and discharge valves for compressors and more particularly to such valves for gas or air compressors wherein the valvular members are of the reed or leaf type, a plurality of which act together to provide a free passage of the fluid medium therethrough.

Valves employing a plurality of reeds for use with compressors are well-known in the art. They are essentially check valves and are used for directing the flow of the air or gas into and out of the compressor chamber, permitting the flow of the medium in one direction and checking its flow in the opposite direction to accomplish the desired directional movement and compression of the medium. The small inertia of the reed type valve lends itself admirably to use with a compressor driven at high speed since this type of valve is more responsive to pressure conditions within the compressor chamber. To obtain this responsiveness, however, the reeds or leaves must be made very thin and flexible and they must be protected against being flexed beyond their elastic limits.

While reeds have been made of tough springy steel and alloys of metals which have high resistance to fatigue, nevertheless breakdowns due to breakage or displacement of the reeds have been considerable. When this type of valve is used as a discharge valve, pressures are encountered which will displace not only the reed but the guard which is provided to protect them.

Other important considerations in providing compressor check valves is to make the flow of the medium through the valve as streamlined as possible and to provide as much port area as possible. To prevent collapse of the reed when it functions to close the port, at least one dimension of the opening must be very narrow, as a thin piece of spring steel can support an enormous pressure over a short distance. Therefore as many elongated narrow ports as possible must be provided to make up the total port area.

The object of the present invention is to provide suction and discharge valves for a compressor of the type described above in which the flow of the gaseous medium through the valves is streamlined and without abrupt changes of direction.

Another object of the present invention is to provide reed-type compressor valves which are low in cost to produce but provide the maximum port area in a given size of valve housing.

Still another object of the invention is to provide compressor valves of the reed type having guards anchored at both ends to give maximum protection to the reed valves.

A further object of the present invention is to provide a guard for the reed, which is readily adjustable and by its adjustment the amount of opening of the reed valve can be likewise adjusted.

A still further object of the present invention is to provide a valve in which the wall of the valve chamber is a plurality of duplicate plate sections, thereby facilitating manufacture.

Other objects of the present invention will become apparent from the description of one embodiment when read with reference to the accompanying drawings in which Figure 1 is an end view of the suction valve made in accordance with the present invention;

Figure 1:
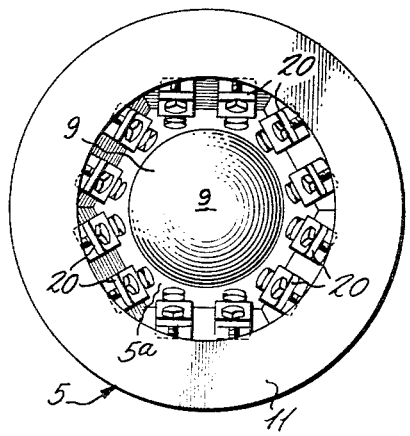
Figure 2:
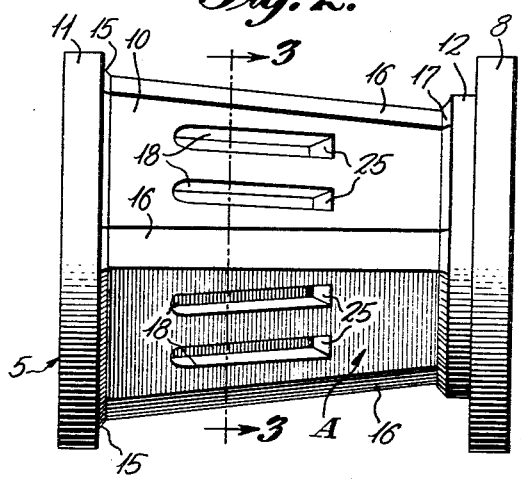
Figure 2 is a side elevation of the suction valve.
Figure 3:
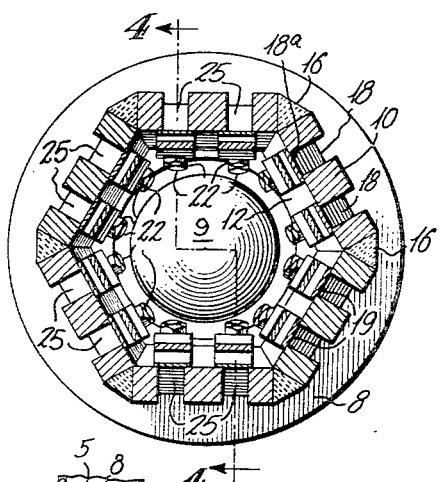
Figure 3 is a transverse sectional view taken along the line 3—3 of Figure 2.
Figure 4:
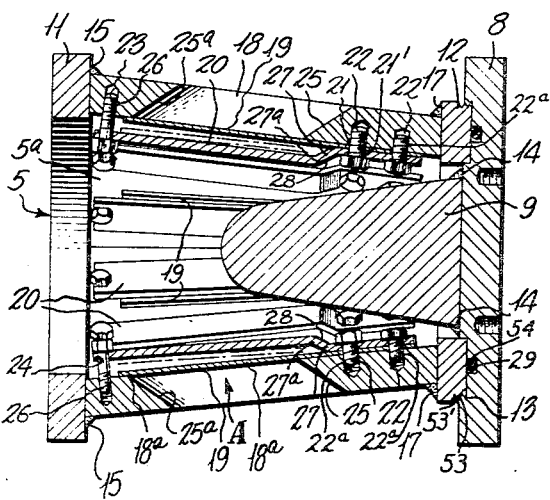
Figure 4 is a longitudinal sectional view of the suction valve taken substantially on the line 4—4 of Figure 3.
Figure 5:
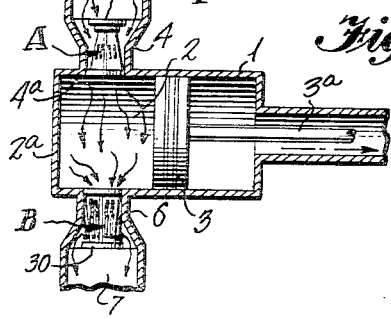
Figure 5 is a schematic diagram of a compressor, illustrating the use of suction and discharge valves.
Figure 6:
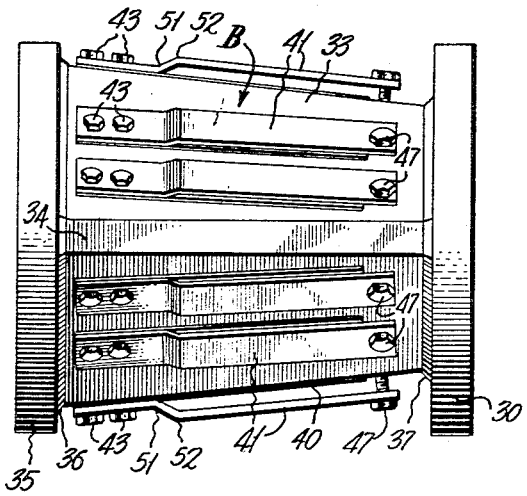
Figure 6 is a side elevation of a discharge valve made in accordance with the present invention.
Figure 7:
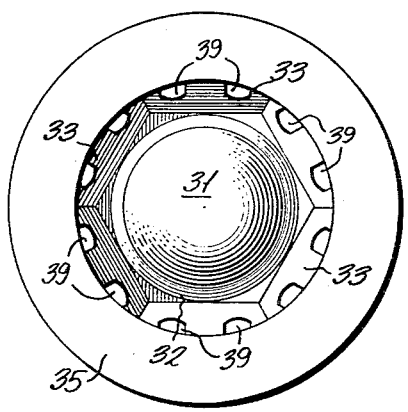
Figure 7 is an end view of the valve shown in Figure 6.
Figure 8:
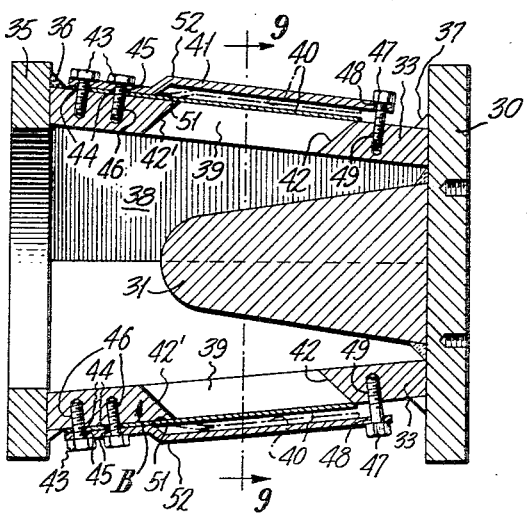
Figure 8 is a longitudinal sectional view of the discharge valve shown in Figure 6.
Figure 9:
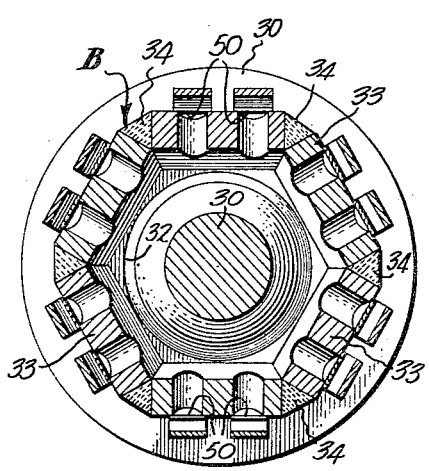
Figure 9 is a transverse sectional view taken along the line 9—9 of Figure 8.

Adverting now to Figures 1 to 5 of the drawings, there is schematically illustrated at Figure 5 a two-cycle, piston-type compressor for compressing air or other gaseous medium, such as ammonia, natural gas and the like. The compressor generally indicated at 1 comprises a cylinder 2, closed at one end, and having a piston 3 driven by a source of power (not shown) through piston rod 3a. Cylinder 2 is provided with a valve housing 4 in which suction valve 5 is seated and valve housing 6 in which discharge valve 7 is seated. As the piston 3 is moved away from the end cylinder wall 2a, pressure with the cylinder is reduced below the pressures in the suction valve housing 4 and the discharge valve housing 6 causing suction valve 5 to open and permit the flow of gas to the cylinder and discharge valve 7 to close to prevent back flow of gas into the cylinder. Upon the return stroke of piston 3 to the end wall 2a, the pressure within the cylinder is raised above that in suction valve housing 4 and discharge valve housing 6, causing discharge valve 7 to open permitting the gas compressed in cylinder 2 to pass out of the cylinder and suction valve 5 to close to check the back flow of gas. This type of compressor is well-known and is used for purposes of illustration, though the valves provided herein may be used with any type of compressor.

Valves 5 and 7 are fastened in housings 4 and 6 in gas-tight relationship by any suitable means of gasketing and attachment (not shown).

Suction valve 5 is a complete assembly which is insertable in and removable from housing 4. The body portion A of suction valve 5 is preferably constructed in two units by welding the parts together. One unit consists of a circular closure plate 8 and a diverter 9. The other unit consists of six tapered plate sections 10 welded together to form a hollow truncated pyramid to the base of which is welded a seating ring 11 and to the opposite end of which is welded a closure ring 12. An annular groove 13 is provided in closure plate 8 to receive the closure ring 12 when the two units are fitted together to form valve chamber 5a.

Diverter 9 is cone-like in shape and it is welded at its base to the center of closure plate 8 by line of welding 14. The diverter 9 extends a substantial distance into the chamber 5a when the two units of the body portion A are joined together.

Seating ring 11 which is welded to the plate sections 10 by line of welding 15 provides the seat for the valve 5 at the cylinder port 4a.

Each of the plate sections 10 is identical with each other plate section 10 and six of them are welded together by lines of welding 16 to form the side walls of chamber 5a.

The closure ring 12 to which the plate sections 10 are welded by line of welding 17 is provided so that the body portion A may be made in two parts which may be later joined together after the welding of the body portion is completed, to facilitate the installation of parts, later to be described, within chamber 5a.

Each plate section 10 is provided with two passageways 18. At the inner ports 18a of passageways 18, reed valves 19 and valve guards, or cages, 20 are installed.

While this invention is being described with respect to a valve being in the form of a six-sided truncated pyramid, with each side having two passageways, it will be readily understood that the number of sides of the pyramid or the number of passageways may be varied as desired. The greater the number of plate sections used the more circular, or cone-like the body portion will become and the greater will be the available total area of the passageways. The width of a passageway is determined by the amount of back pressure which the reed will have to support.

Passageways 18 have beveled ends as at 25 and 25a for directing the flow of the gaseous medium through the valve, the bevel being in the direction of flow of the gas from the outside of body portion A to cylinder port 4a.

Reed valve 19 is made of cold rolled spring steel, a suitable alloy or other material having similar characteristics of springiness and resistance to shearing and fatigue. Reed 19 is of slightly greater width than passageway 18 and extends from its point of attachment on plate section 10 near closure ring 12 to a short distance beyond the opposite end of passageway 18 thereby completely covering the passageway 18 when the reed 19 is in repose. Reed 19 is provided with holes 21 to receive screws 22 which also pass through guard 20 and are received in threaded holes 22a in plate section 10 to attach the reed and guard to the plate section.

Guard 20 is made of heavier gauge metal or alloy than reed 19; and, while springy it is much more resistant to flexing than the reed. It is made of a size to generally overlie reed 19 and extend beyond the free end of the latter. Guard 20 is drilled as at 21' to receive screws 22 to attach it to plate section 10 as described above. At the opposite end of fixed attachment of guard 20, there is provided an adjustment screw 23 which passes through a hole 24 in guard 20 and is threadedly engaged in hole 26 in plate section 10 by means of which the distance between the plate section and the guard may be adjusted and thereby the limit of movement of reed 19 away from the port 18a is likewise adjustable. Screw 23 also acts as an anchor for the movable end of guard 20 so that it can withstand the impact of greater pressures created by suction in cylinder 2.

Guard 20 is formed with two bends as at 27 and 27a near its point of fixed attachment. These bends are made arcuate rather than angular. The bend at 27 is away from plate section 10 and the bend at 27a is a reverse bend so that the part of guard 20 which overlies the passage 25 is approximately parallel with plate section 10 but offset therefrom. The arcuate bend at 27 permits the flexing of reed 19 to be distributed over a larger area to avoid the shearing effect of flexing the reed at a sharp angle. The bend of the guard 20 at 27a insures that the reed 19 will not be in continuous contact with the guard when the reed has been forced away from passageway port 18a to its limit, and that pressure change in the opposite direction will act upon the reed to snap it away from guard 20 rather than to force the guard to the passageway port along with the reed. Also, the bowing of the reed as it is forced into the bend of the guard at 28 will act to spring the reed away from the guard.

The adjustment of the screw 23 is made according to the relationship of the speed of travel and the distance traveled by piston 3. Thus, for a compressor with a short stroke driven at high speed the screw 22 would be adjusted toward plate section 10 so that the reed 19 will be very limited in its movement away from port 18a. This results in greater bowing and therefore storing of energy in reed 19 to return it to its seat immediately at the beginning of the pressure stroke of piston 3.

Valve body portion A is assembled first in two units. The plate sections 10 are welded to each other and to the seating ring and closure ring, forming one unit. The other unit comprises the closure plate 12 to which is welded the diverter 9. The reed valves and guards are then attached by means of tools inserted through the closure ring 12 and the adjustment screws 23 are installed by inserting a tool through the seating ring 11. After the reeds and guards are installed the closure plate 8 is attached to the closure ring 12, in any suitable readily detachable manner, such as by threadingly fastening them together by means of the screwthreads 53, 53'. The holes 28 may be provided in the closure plate 8 for insertion of a tool to facilitate holding the closure plate 8 for attachment of the body portion A. Any suitable gasketing between the closure ring and the closure plate may be used, one form being indicated at 29 which is a flexible ring-type of gasket reposing in an annular groove 54.

Figures 6, 7, 8 and 9 show a discharge valve made in accordance with the present invention. The construction and manner of operation of the discharge valve is very similar to that of the suction valve described herein. The position of discharge valve 7 with respect to the compressor is shown in Figure 5, and its purpose is to permit the gases compressed in cylinder 2 to flow therefrom and prevent their return to the cylinder. Since the gases pass from within the valve chamber to the outside of the chamber, which is the reverse of the flow through the suction valve, the reeds are placed on the outer port of the passageway and the point of fixed attachment is reversed from that of the suction valve so that there will be the least possible change in the direction of flow of the medium through the valve. Also, since the reeds and guards are installed on the outside of the valve body B, there is no difficulty in installing them after the fabrication of the valve body. Therefore, the plate sections are welded directly to the closure plate rather than to a closure ring.

The body portion B of discharge valve 7 comprises circular closure plate 30 to which is welded centrally thereof diverter 31 by a line of welding 32. A plurality of tapered plate sections 33, in this case six, are welded together by lines of welding 34. The plate sections are then welded to seating ring 35 by a line of welding 36 and to the closure plate 30 by a line of welding 37 to form valve chamber 38. Each plate section 33 has two passageways 39 overlying which are reeds 40 and guards 41 on the outside of the valve chamber 38. The passageway ends are beveled as at 42 and 42'. Reeds 40 and guards 41 are fixedly attached to plate sections 33 by means of bolts 43 which pass through holes 44 in reeds 40 and holes 45 in guard 41 and threadedly engage in holes 46 in plate section 33. Guard 41 is adjustably anchored by means of adjustment bolt 47 which passes through hole 48 in the end of the guard opposite its fixedly attached end and threadedly engages hole 49 in plate section 33.

In the case of the discharge valve 7, it will be noted that the reeds and guard are fixedly attached near the seating ring 35 to cause a streamlined flow of the gas. On the suction stroke of piston 3, the reeds 40 seat on the outer port 50 of passageway 39 and prevent gas from flowing into the cylinder through the passageway. On the compression stroke of piston 3, reeds 40 are flexed away from port 48 and gas compressed in cylinder 2 passes out through the passageway 39. Guards 41 are formed in the same manner and for the same purpose as guards 20 and have bend 51 away from the plate section and reverse bend 52 so that the guard will lie in approximately parallel but offset relation to the plate section 33.

Thus, it will be seen that there has been provided novel suction and discharge valves for a compressor, having increased efficiency due to the streamlined flow of the medium through both valves and due to the adjustable alignment of the suction and discharge valves with each other and with the compressor on which they are installed. Maintenance costs and losses due to breakdowns are greatly reduced due to the protection afforded the reeds by the novel guard construction and anchoring. Valves manufactured in accordance with this invention may be fabricated from parts that can be readily stamped out of ordinary stock materials, assembled in a jig and fillet welded together, resulting in lower production costs, since investment in tools and equipment will be reduced to a minimum.

While this invention has been described with respect to a preferred embodiment thereof, it will be apparent that changes may be made without departing from the scope of the invention as defined in the appended claims.

What is claimed is:

1. Check valve of the multiple passageway type for installation in valve housings at the suction and discharge ports of a compressor chamber to direct the flow of a gaseous medium being compressed into and out of said compressor chamber comprising, a truncated pyramidal body portion defining a hollow chamber, said body portion being a plurality of flat plate sections welded together and a closure at one end of said body portion, the opposite end of said body portion being open, said flat plate sections having a width which tapers inwardly toward said closure each of said flat plate sections having at least one valved passageway therethrough, a reed having a free end and a fixed end for valving said passageway, said fixed end being attached to said body portion near said passageway, a reed guard overlying said reed and limiting the movement of said reed away from said passageway, said guard having one end fixedly attached with respect to said body portion and in alignment with the attachment of said reed and the opposite end of said reed guard overlying the free end of said reed, said reed guard being biased away from said passageway, an outwardly directed offset portion in said reed guard adjacent said fixedly attached end of said reed guard, and an extendable limit stop operatively coupled with said opposite end of said reed guard for spacing said reed guard distances selected at will from said passageway to limit the outward flexing of said reed.

2. Check valve of the multiple passageway type for installation in valve housings at the suction and discharge ports of a compressor chamber to direct the flow of a gaseous medium being compressed into and out of said compressor chamber comprising, a truncated pyramidal body portion defining a hollow chamber, said body portion being a plurality of tapered plate sections welded together and a closure at one end of said body portion, the opposite end of said body portion being open, each of said plates sections having at least one valved passageway therethrough, a reed having a free end and a fixed end for valving said passageway, said fixed end being attached to said body portion near said passageway, a reed guard overlying said reed and limiting the movement of said reed away from said passageway, an outwardly directed step in said guard, whereby an offset is provided in said guard and said reed when flexed into said offset by the pressure of said medium will store additional energy to move away from said guard when said pressure is reduced, said guard having one end fixedly attached with respect to said body portion and in alignment with the attachment of said reed and the opposite end of said guard being adjustably anchored for movement to and away from said passageway and said free end of said reed.

3. Check valve of the multiple passageway type to seat in the suction and discharge port housings of a compressor to direct the flow of the gaseous medium being compressed into and out of the compressor comprising, a body portion defining a truncated pyramidal hollow valve chamber including a seating ring, a closure and therebetween a plurality of tapered flat plate sections welded to each other along their side edges and to said seating ring and said closure, each said flat plate section provided with at least one elongated narrow passageway longitudinally thereof, a diverter affixed to said closure and extending into said chamber to direct the flow of said medium through said valve chamber, each said passageway valved by a flexible reed attached to said flat plate section at one end of said passageway and seated to prevent the flow of said medium through said passageway from that side of said flat plate section on which said reed is attached and flexing away from its seat on impact of said medium passing through the passageway of said flat plate section from the opposite direction, said reed being attached for flexing in the direction of flow of the gaseous medium through said passageway, a guard provided for each said reed, said guard overlying and registering with said reed, said guard being fixedly attached to said plate section at a point approximately corresponding to said point of attachment of said reed, and an extendable limit stop operatively coupled with said opposite end of said reed guard for spacing said reed guard distances selected at will from said passageway to limit the outward flexing of said reed whereby the guard will adjustably limit the flexing of said reed away from said passageway.

4. Check valve for installation in the valve housings at the suction and discharge ports of a compressor chamber to direct the flow of gaseous medium being compressed into and out of said compressor chamber comprising, a hollow body portion having one open end, a plurality of passageways in said body portion, a reed having a free end and a fixed end for valving each passageway, said fixed end being attached to said body portion adjacent a first end of said passageway and said reed completely covering said passageway, a reed guard overlying said reed and limiting the movement of said reed away from said passageway, said guard having one end fixedly attached with respect to said body portion and in alignment with the attachment of said reed and the opposite end of said guard overlapping the free end of said reed, said guard being biased away from said passageway, and an extendable limit stop operatively coupled with said opposite end of said guard for spacing said guard distances selected at will from said passageway to limit the outward flexing of said reed, said limit stop being adjustably attached to said body portion adjacent a second end of said passageway.

References Cited in the file of this patent

UNITED STATES PATENTS

| | | |
|---|---|---|
| 726,277 | Fuller | Apr. 28, 1903 |
| 756,868 | Mansfield | Apr. 12, 1904 |
| 1,334,197 | Wainwright | Mar. 16, 1920 |
| 1,632,385 | Uallman | June 14, 1927 |
| 1,633,772 | Clapp | June 28, 1927 |
| 1,810,498 | Ploeger | June 16, 1931 |
| 1,955,007 | McClay | Apr. 17, 1934 |
| 2,682,701 | Pote | July 6, 1954 |
| 2,739,581 | Garrett | Mar. 27, 1956 |

FOREIGN PATENTS

| | | |
|---|---|---|
| 456,430 | France | Apr. 8, 1913 |
| 60,774 | Denmark | Mar. 22, 1943 |